Jan. 27, 1925.

F. F. FORSHEE 1,524,546

ELECTRIC WAFFLE IRON

Filed Aug. 8, 1922

WITNESSES:
O. N. Cochran
H. M. Bickel

INVENTOR
Frank F. Forshee.
BY
Wesley G. Carr
ATTORNEY

Patented Jan. 27, 1925.

1,524,546

UNITED STATES PATENT OFFICE.

FRANK F. FORSHEE, OF MANSFIELD, OHIO, ASSIGNOR TO WESTINGHOUSE ELECTRIC PRODUCTS COMPANY, A CORPORATION OF MICHIGAN.

ELECTRIC WAFFLE IRON.

Application filed August 8, 1922. Serial No. 580,402.

*To all whom it may concern:*

Be it known that I, FRANK F. FORSHEE, a citizen of the United States, and a resident of Mansfield, in the county of Richland and State of Ohio, have invented a new and useful Improvement in Electric Waffle Irons, of which the following is a specification.

My invention relates to electrically-heated devices and particularly to electrically-heated portable waffle irons.

The object of my invention is to provide a relatively simple and compact electrically-heated waffle iron having a combined tray and supporting means removably associated therewith.

In practicing my invention, I provide a plurality of superposed electrically-heated casings having mounted thereon a means for carrying the device and for raising the upper casing. I provide a combined tray and supporting means for the two casings which may be quickly removed by a turning movement thereof relative to the casings.

In the single sheet of drawings.

Figure 1:
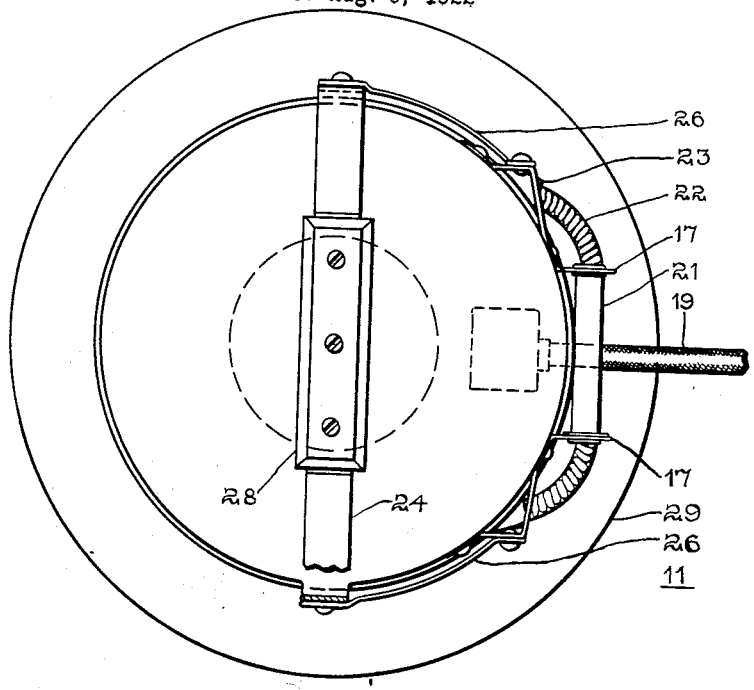
Figure 1 is a top plan view of an electrically-heated waffle iron embodying my invention.
Figure 2:
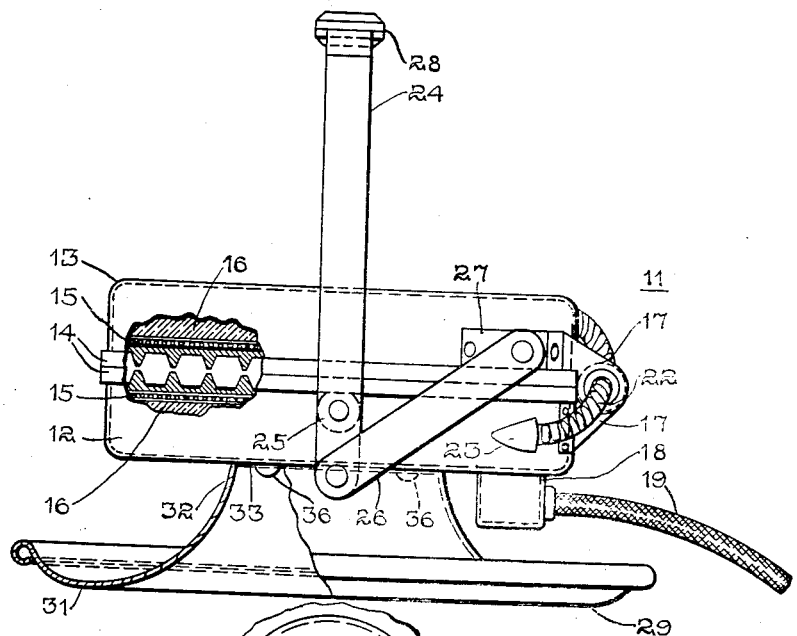
Fig. 2 is a view in side elevation thereof.
Figure 3:
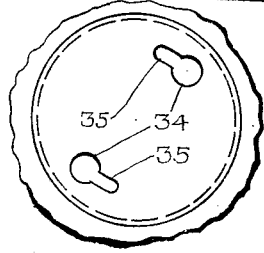
Fig. 3 is a fragmentary top plan view of a supporting means associated with the device embodying my invention.

An electrically-heated waffle iron, designated generally by the numeral 11, comprises a lower metal casing 12 and an upper metal casing 13, each of which is provided with a baking surface 14, secured thereto at one face thereof, in any suitable or desired manner. The two casings 12 and 13 may be of any suitable or desired contour but are here shown as being substantially circular in shape.

Electric heating elements 15, of any suitable or desired construction, are located immediately adjacent to the baking surfaces 14, and a quantity 16 of a suitable heat-insulating material, such as mineral wool, is located between the heating element 15 and the other surface wall of the respective casings.

A terminal box 18 is located at the rear of the device and below the bottom casing 12, into which extends one end of a supply-circuit conductor 19 of usual construction.

The two superposed casings are pivotally connected together by suitable hinge members 17 secured against the respective walls of the upper and the lower casings and located at the back of the device. The outer perforated end of the hinge members 17 is made relatively large, and a tubular member 21 extends between the co-operating pairs of members in order to provide a covering for a flexible armored conduit 22, within which is located a plurality of conductors (not shown) which electrically connect the heating elements 15, located in the upper and the lower casings. Socket members 23 are provided at the rear of the top and of the bottom casings, respectively, into which the ends of the armored conduit 22 extend.

A combined means for carrying the device and for raising the upper casing relatively to the lower casing during the use of the device, comprises a bail 24, pivotally mounted upon the lower casing 12, which is provided with suitable bosses or lugs 25 to permit of the bail 24 being pivotally mounted thereagainst. Each of the lower ends of the bail is pivotally connected to one end of a link member 26, the other end of which is pivotally connected to an abutment 27, which is constituted by a metal strap member of substantially L-shape, the ends of which are suitably secured against the upper casing 13. Suitable heat-insulating members 28 are provided at the intermediate portion of the bail 24 to insure a relatively cool-carrying-portion for the operator. When it is desired to raise the upper casing relatively to the lower casing, the upper portion of the bail is moved forwardly and downwardly whereby, through the action of the link members 26, the upper casing 13 is given a turning movement on the hinge members 17 relatively to the lower casing. This part of the device constitutes no part of my present invention as it has been disclosed and claimed in Patent No. 1,401,688, issued Sept. 27, 1921.

A combined tray and supporting means 29 comprises a sheet-metal member having a contour substantially like that of the casings and having a depressed outer portion 31, the diameter of which is substantially the same as the diameter of the casings. The member 29 is provided with a central raised portion 32 having a flat upper surface 33. The surface 33 is provided with a plurality of openings 34 substantially circular in outline and located in diametral spaced relation. The openings 34 have extension slots 35 that project in opposite directions. Rivet members 36 are secured to the bottom of the lower casing 12 and are so located as to register with the openings 34 and the extensions 35. When it is desired to assemble the two casings and the carrying means on the combined tray and supporting member, the heads of the rivet members 36 are caused to enter the openings 34 and either the tray 29 is given a turning movement relatively to the two casings 12 and 13 or the casings are given a turning movement relatively to the tray, as the operator may elect. This operation locks the two casings against the top of the combined tray and support, and a reverse operation permits of its quick removal therefrom.

Since it is not always possible, in the operation of baking waffles, to place upon the lower baking surface, the correct amount of batter to just cover the same, it frequently happens that some batter flows, or is pressed out, between the two co-operating baking surfaces, but heretofore, it has not been customary to provide means for receiving such overflow. The device embodying my invention provides a relatively simple, compact combined means for supporting the waffle iron and for receiving such overflow, which means permits of its quick removal from the rest of the device for the purpose of cleaning the same.

Various modifications may be made in my invention without departing from the spirit and scope thereof, and I desire, therefore, to be limited only by the scope of the appended claims.

I claim as my invention:—

1. In an electrically-heated device, the combination with a plurality of superposed casings, an electric-heating element in each casing, and hinge members for operatively securing said casings together, of means for electrically connecting the heating element in the upper casing to the heating element in the lower casing, said connecting means passing through said hinge members being supported and protected thereby.

2. In an electrically-heated device, the combination with a plurality of superposed electrically-heated casings, of a combined tray and supporting base for said casings removable therefrom by a turning movement thereof relatively to said casings.

3. In an electrically-heated device, in combination, a base comprising a depressed portion adjacent the outer periphery thereof and a centrally-disposed raised portion, a lower electrically-heated casing, an upper electrically-heated casing hinged to said lower casing, and means on said lower casing for removably securing it to said raised portion.

4. In an electrically-heated device, in combination, a base comprising a depressed portion adjacent the outer periphery thereof and a centrally-disposed raised portion, a lower electrically-heated casing, an upper electrically-heated casing hinged to said lower casing, and means on said lower casing for removably securing it to said raised portion by a turning movement relatively thereto.

5. In an electrically-heated device, in combination, a base comprising a rim portion, a depressed portion within said rim portion and a raised central portion, a plurality of superposed electrically-heated casings located above said base and removably secured thereto, the casings and the depressed portion being substantially co-extensive to permit the depressed portion to constitute a tray for said casings.

6. In an electrically-heated waffle iron, in combination, a base member comprising a rim portion, a depressed portion within said rim portion and a raised central portion having a plurality of slots in its upper surface, a plurality of electrically-heated casings located on said base, and means on one of said casings fitting into said slots for securing said casings to the raised central portion of said base.

7. In an electrically-heated waffle iron, in combination, a plurality of superposed electrically-heated casings, a combined tray and supporting base and means on one of said casings co-operating with embodying means on said base for removably securing the casings thereon.

8. In an electrically heated device, the combination with an upper and a lower casing, an electric-heating element in each casing and hinge members for operatively securing said casings together, of means for electrically connecting the heating element in the upper casing to the heating element in the lower casing, said connecting means being supported and protected by the hinge members.

In testimony whereof, I have hereunto subscribed my name this 14th day of July, 1922.

FRANK F. FORSHEE.